United States Patent
Zhu

(10) Patent No.: US 11,748,768 B2
(45) Date of Patent: Sep. 5, 2023

(54) COMMODITY ANTI-COUNTERFEIT VERIFICATION SYSTEM BASED ON NATURAL BIOLOGICAL INFORMATION

(71) Applicant: Shanghai iGlobalID Network Co., Ltd, Shanghai (CN)

(72) Inventor: Wenqiang Zhu, Shanghai (CN)

(73) Assignee: Shanghai iGlobalID Network Co., Ltd, Shanghai (CN)

( * ) Notice: Subject to any disclaimer, the term of this patent is extended or adjusted under 35 U.S.C. 154(b) by 691 days.

(21) Appl. No.: 16/669,331

(22) Filed: Oct. 30, 2019

(65) Prior Publication Data
US 2020/0065829 A1   Feb. 27, 2020

Related U.S. Application Data

(63) Continuation of application No. PCT/CN2018/102272, filed on Aug. 24, 2018.

(30) Foreign Application Priority Data

Aug. 17, 2017   (CN) .......................... 201710706849.4

(51) Int. Cl.
   *G06Q 30/018*   (2023.01)
   *G06V 20/80*   (2022.01)
   *G06V 20/00*   (2022.01)
(52) U.S. Cl.
   CPC ......... *G06Q 30/0185* (2013.01); *G06V 20/00* (2022.01); *G06V 20/80* (2022.01)
(58) Field of Classification Search
   None
   See application file for complete search history.

(56) References Cited

U.S. PATENT DOCUMENTS

| | | | |
|---|---|---|---|
| 6,309,690 B1* | 10/2001 | Brogger | G06K 19/06009 427/256 |
| 2003/0204743 A1* | 10/2003 | Devadas | G06F 21/72 257/E23.179 |

(Continued)

FOREIGN PATENT DOCUMENTS

| | | |
|---|---|---|
| CN | 101577069 A | 11/2009 |
| CN | 101739576 A | 6/2010 |

(Continued)

OTHER PUBLICATIONS

International Search Report (in English and Chinese) and Written Opinion issued in PCT/CN2018/102272, dated Dec. 5, 2018, 9 pages provided.

*Primary Examiner* — Jan P Mincarelli
(74) *Attorney, Agent, or Firm* — HAMRE, SCHUMANN, MUELLER & LARSON, P.C.

(57) ABSTRACT

The invention relates to commodity anti-counterfeit verification system based on natural biological information. The system includes an anti-counterfeit information generation module used for generating unique anti-counterfeit information corresponding to a commodity, an anti-counterfeit database used for storing the unique anti-counterfeit information generated by the anti-counterfeit information generation module, and an anti-counterfeit information verification module used for carrying out anti-counterfeit verification on the commodity according to the unique anti-counterfeit information stored in the anti-counterfeit database. The anti-counterfeit information generation module comprises an identity information generator, a natural biological information generation assembly, and an information binder. Compared with the prior art, the system has the advantages of being easy to implement, good in anti-counterfeit performance, capable of reducing costs, and the like.

8 Claims, 2 Drawing Sheets

(56) References Cited

U.S. PATENT DOCUMENTS

| | | | | |
|---|---|---|---|---|
| 2013/0087620 A1* | 4/2013 | Sharma | ............ | G06K 19/06159 |
| | | | | 235/494 |
| 2014/0279613 A1* | 9/2014 | Lee | .................... | G06Q 30/0185 |
| | | | | 705/318 |
| 2016/0350996 A1* | 12/2016 | Noh | ......................... | G07D 7/06 |

FOREIGN PATENT DOCUMENTS

| | | | | |
|---|---|---|---|---|
| CN | 102930440 | A | 2/2013 | |
| CN | 104794519 | A | 7/2015 | |
| CN | 107292636 | A | 10/2017 | |
| WO | WO-2009115611 | A2 * | 9/2009 | ............... G06K 9/00 |
| WO | 2016136900 | A1 | 9/2016 | |

* cited by examiner

COMMODITY ANTI-COUNTERFEIT VERIFICATION SYSTEM BASED ON NATURAL BIOLOGICAL INFORMATION

BACKGROUND OF THE INVENTION

Technical Field

The invention relates to the field of anti-counterfeit technology, in particular to a commodity anti-counterfeit verification system based on natural biological information.

Description of Related Art

The rise of E-commerce and purchasing by agents has made shopping fast and convenient. Accordingly, more and more counterfeits come into being are produced and are increasingly spread. Even many grade-A counterfeits which are counterfeited through advanced means are very so similar to the genuine ones that they cannot be verified even in person the face shop. Some lawbreakers make profits in this way, while the benefits of brand owners and customers are harmed. For instance, to protect the rights and interests of customers, the government has set relevant online shopping regulation to permit the customers to exchange or return commodities purchased from sellers via the network within seven days from the day receiving the commodities without for any reasons.

This regulation is usually misused by the lawbreakers. For instance, the lawbreakers purchase genuine commodities while returning counterfeit ones. After the sellers receive the returned commodities, whether or not the returned commodities are genuine ones is determined only by professionals or through certain external factors such as tags, packages, anti-theft buckles, and the like and cannot be rapidly and accurately judged by means of certain inherent characteristics of the commodities or labels attached to the commodities, and consequentially, the counterfeit products may successfully returned due to misjudgment, which in turn harms the interests of brand owners and disturbs the business environment.

The most common anti-counterfeit method on the present market is based on two-dimension codes. However, the existing anti-counterfeit method based on two-dimensional codes has the following defects: due to the fact that the two-dimensional codes printed on commodities can be checked repeatedly, in order to prevent counterfeiters from printing identical two-dimensional codes on the commodities, the two-dimensional codes are generally covered with medium ink such as coatings and fibers or special materials such as special gratings or adopt other anti-counterfeit techniques, which increases the anti-counterfeit cost based on the two-dimensional codes; although the counterfeiting difficulty and cost are increased, counterfeiting still remains achievable, and customers cannot effectively figure out counterfeit products, the reliability of manual comparison is poor, time consumption and labor consumption are high, and thus, this method is hardly popularized. In view of this, the anti-counterfeit effect of the existing physical anti-counterfeit method has yet to be improved.

Chinese Invention Patent Application No.CN200810097513 provides a random texture-based anti-counterfeit product and method which are designed in such a manner: fibers or filaments are randomly attached to the surface of a specific region of a commodity, directional information (vertical or horizontal) of these attachments (fibers or filaments) is converted into digital characteristics which are compiled into a binary code consisting of "0" and "1" (or a ternary code or quaternary code) so as to distinguish different products, and in this way, the commodity is made approximately unique. However, this method has the following defects: due to the fact that the attachments are added to the surface of the commodity, the angle of the fibers or filaments which are written into the binary code consisting of "0" and "1" (or the ternary code or quaternary code) has a wide permissible range, and the binary code (or the ternary code or quaternary code) still remains replicable; counterfeiters can obtain the binary code (or the ternary code or quaternary code) corresponding to a genuine commodity by similar photographing, converting and encoding procedures, then figure out the direction (vertical or horizontal) of the fibers or filaments in this characteristic region, and manually attach the corresponding fibers or filaments to the surface of a counterfeit product to duplicate the identify authentication information of the genuine commodity; and the direction of the fibers or filaments on the duplicated commodity just needs to be approximately identical with that of the genuine product instead of being exactly the same as that of the genuine product. Although the counterfeiting method is difficult implement and high in cost, it is still profitable for counterfeiters when used for counterfeiting valuable commodities. In addition, by adoption of this counterfeiting method, the surface of commodities needs to be processed, which increases the production difficulty and may damage the surface of the commodities, and consequentially, economic losses are caused.

BRIEF SUMMARY OF THE INVENTION

The objective of the invention is to solve the above-mentioned problems by providing a commodity anti-counterfeit verification system based on natural biological information.

The objective of the invention is fulfilled through the following technical solution:

A commodity anti-counterfeit verification system based on natural biological information comprises:

An anti-counterfeit information generation module used for generating unique anti-counterfeit information corresponding to a commodity;

An anti-counterfeit database used for storing the unique anti-counterfeit information generated by the anti-counterfeit information generation module; and An anti-counterfeit information verification module used for carrying out anti-counterfeit verification on the commodity according to the unique anti-counterfeit information stored in the anti-counterfeit database.

The anti-counterfeit information generation module comprises:

An identity information generator used for randomly generating unique identify information corresponding to the commodity;

A natural biological information generation assembly used for generating natural biological information corresponding to the commodity; and An information binder used for binding and packing the unique identify information generated by the identify information generator and the natural biological information generated by the natural biological information generation assembly.

The natural biological information generation assembly comprises:

A natural biological information acquisition unit used for acquiring an image of a unique characteristic part of a commodity which has a unique textural property; and A natural biological information addition unit used for adding natural biological information to a commodity which does not have a unique textural property.

The natural biological information is added specifically as follows: the natural biological information with a unique property is added to the commodity with anti-counterfeit ink.

The natural biological information with the unique property includes fingerprints.

The anti-counterfeit information verification module comprises:

An identify information recognizer used for recognizing the identity information of the commodity to determine the identity of the commodity;

A natural biological information acquisition unit used for acquiring an image according to the natural biological information of the commodity; and An anti-counterfeit information verification unit used for carrying out anti-counterfeit verification on the commodity according to the identity of the commodity determined by the identify information recognizer and the image acquired by the natural biological information acquisition unit.

Anti-counterfeit verification is carried out specifically as follows:

(s1) The identify information of the commodity is compared with information in the anti-counterfeit database to determine whether or not the commodity exists; if yes, (s2) is performed; or, if not, it indicates that the commodity is a counterfeit commodity;

(s2) Natural biological information corresponding to the identify information of the commodity is extracted from the anti-counterfeit database and is compared with the acquired image to carry out image information matching; and (s3) Whether or not a matching result reaches a specified threshold is judged; if yes, it indicates that the commodity is a genuine commodity; or, if not, it indicates that the commodity is a counterfeit commodity.

When the natural biological acquisition unit acquires the image, the angle of an integrated light source and a temperature variation need to be controlled within specified ranges.

The anti-counterfeit information verification module further comprises a verification result display assembly used for displaying an anti-counterfeit verification result of the commodity.

The verification result display module comprises a display screen and a wireless communicator, wherein the wireless communicator is connected to an intelligent electronic device of a user.

The unique identity information includes one-dimensional codes, two-dimensional codes, three-dimensional codes, serial numbers, or RFID tags.

Compared with the prior art, the invention has the following beneficial effects:

(1) The identity information generator and the natural biological information generation assembly are arranged in the anti-counterfeit information generation module, and the identify information of commodities is made to be in one-to-one correspondence with the natural biological information of the commodities. Compared with the binary codes of the fibers on the surfaces of the commodities, the anti-countering system of the invention can be implemented more easily and is low in cost; and meanwhile, the natural biological information is obtained without processing and can hardly be counterfeited, so that the anti-counterfeit effect is better.

(2) The natural biological information generation assembly comprises the natural biological information acquisition unit and the natural biological information addition unit, the natural biological information a commodity having a unique textural property is acquired to serve as an anti-counterfeit standard, and natural biological information is added to a commodity which does not have a unique textural property, so that it is guaranteed that each commodity has a unique property and cannot be counterfeited, and the anti-counterfeit effect is improved.

(3) Addition of the natural biological information specifically refers to that natural biological information with a unique property is added to a commodity with anti-counterfeit ink, so that the added natural biological information is unlikely to be destroyed, and the anti-counterfeit performance of the added natural biological information is further improved by the anti-counterfeit ink.

(4) The natural biological information with the unique characteristic includes fingerprints; as the patterns, breakpoints and junctions the fingerprints of different people are different, which means that the fingerprints of each person are unique, and the depths, sizes and areas of texture formed when the fingerprints are impressed with different forces are also different, and thus, the fingerprints cannot be counterfeited. The random combined probability similar to figures is achieved through combinations to fulfill one hundred billion changes to completely meet the requirements of manufactures for random characteristics of one pattern for different commodities (5) When the anti-counterfeit information verification module is used for anti-counterfeit verification, whether the identity information of a returned or exchanged commodity exists in the anti-counterfeit database is determined first to guarantee primary anti-counterfeit verification; after it is determined that the identity information of the commodity exists, an image is acquired and is compared with the natural biological information corresponding to the identity information in the anti-counterfeit database to guarantee secondary anti-counterfeit verification (main anti-counterfeit verification); and through dual anti-counterfeit verification, the counterfeiting risk is completely avoided, and the anti-counterfeit effect is greatly improved.

(6) When the natural biological information acquisition unit acquires an image, the angle of the integrated light source and the temperature variation are controlled within certain ranges to acquire the corresponding image, so that the image is unlikely to be counterfeited by counterfeiters, and commodities are not prone to being duplicated; and meanwhile, the appearance of the commodities will not be affected.

(7) The anti-counterfeit information verification module further comprises the verification result display assembly which comprises a display screen and a wireless communicator, a verification result can be visually displayed by the display screen, the wireless communicator is connected to an intelligent electronic device of a user and wirelessly transmits the verification result to the electronic device of the user, and thus, the user can check and store the verification result anytime and anywhere.

(8) The unique identity information includes one-dimensional codes, two-dimensional codes, three-dimensional codes, series numbers, or RFID tags as actually required, so that implementation is flexible, and the application range is wide.

DETAILED DESCRIPTION OF THE INVENTION

The invention is detailed below with reference to the accompanying drawings and embodiments. The following embodiments are implemented according to the technical solution of the invention to provide a detailed implementation and a specific operation process. However, the protection scope of the invention is not limited to the following embodiments.

Figure 1:
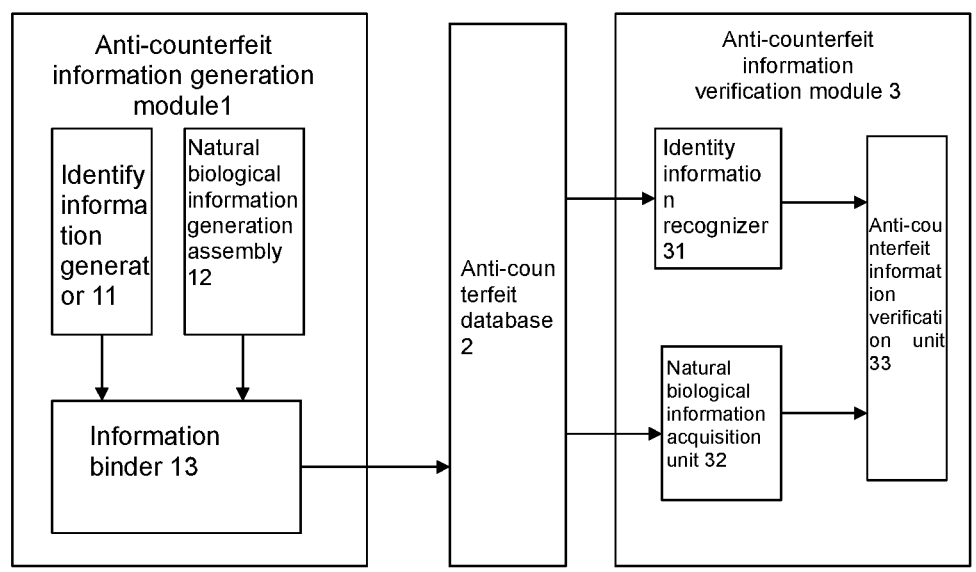
FIG. 1 is a structural diagram of a system of the invention.

As shown in FIG. 1, this embodiment provides a commodity anti-counterfeit verification system based on natural biological information. The system comprises an anti-counterfeit information generation module 1 used for generating unique anti-counterfeit information corresponding to a commodity, an anti-counterfeit database 2 used for storing the unique anti-counterfeit information generated by the anti-counterfeit information generation module 1, and an anti-counterfeit information verification module 3 used for carrying out anti-counterfeit verification on the commodity according to the unique anti-counterfeit information stored in the anti-counterfeit database 2, wherein the anti-counterfeit information generation module 1 comprises an identity information generator 11 used for randomly generating unique identify information corresponding to the commodity, a natural biological information generation assembly 12 used for generating natural biological information corresponding to the commodity, and an information binder 13 used for binding and packing the unique identify information generated by the identify information generator 11 and the natural biological information generated by the natural biological information generation assembly.

Wherein, the natural biological information generation assembly 12 comprises a natural biological information acquisition unit 32 used for acquiring an image of a unique characteristic part of a commodity which has a unique textural property, and a natural biological information addition unit used for adding natural biological information of a commodity which does not have a unique textural property. The natural biological information is added specifically as follows: the natural biological information with a unique property is added to the commodity with anti-counterfeit ink. The anti-counterfeit information verification module 3 comprises an identify information recognizer 31 used for recognizing the identity information of the commodity to determine the identity of the commodity, a natural biological information acquisition unit 32 used for acquiring an image according to the natural biological information of the commodity, and an anti-counterfeit information verification unit 33 used for carrying out anti-counterfeit verification on the commodity according to the identity of the commodity determined by the identify information recognizer 31 and the image acquired by the natural biological information acquisition unit 32. When the natural biological acquisition unit acquires the image, the angle of an integrated light source and the temperature variation need to be controlled within specified ranges. The anti-counterfeit information verification module 3 further comprises a verification result display assembly used for displaying an anti-counterfeit verification result of the commodity. The verification result display module comprises a display screen and a wireless communicator, wherein the wireless communicator is connected to an intelligent electronic device of a user. The unique identity information includes one-dimensional codes, two-dimensional codes, three-dimensional codes, or RFID tags.

Figure 2:
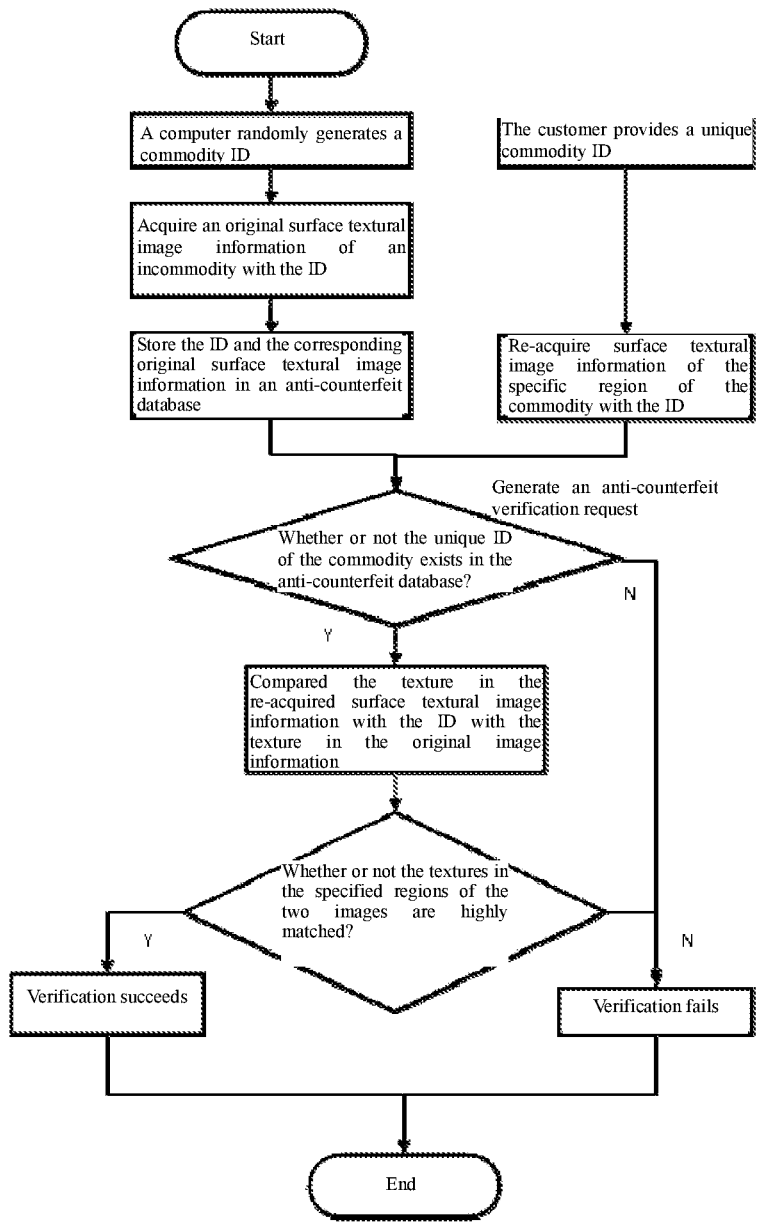
FIG. 2 is a flow diagram for anti-counterfeit implementation based on the system of the invention;
Reference signs: 1, anti-counterfeit information generation module; 2, anti-counterfeit database; 3, anti-counterfeit information verification module; 11, identity information generator; 12, natural biological information generation assembly; 13, information binder; 31, identity information recognizer; 32, natural biological information acquisition unit; 33, anti-counterfeit information verification unit.

As shown in FIG. 2, anti-counterfeiting verification is carried out based on the above system specifically as follows: first, the identify information generation module randomly generates a unique ID number and binds the unique ID number to a specific commodity, original surface textural image information of a specific region of the commodity with the ID number is acquired, and the ID number and the corresponding original image information are stored in the anti-counterfeit database 2 of a verification server; after a returned or exchanged commodity is received, an anti-counterfeit verification request formed by the surface textural image information of the specific region of the commodity with the ID number and the ID number is sent to the anti-counterfeit information verification unit 33; the anti-counterfeit information verification unit 33 searches for the ID number in the anti-counterfeit verification request and compares the image information in the anti-counterfeit verification request with the original image information corresponding to the ID number in the anti-counterfeit database 2 for texture verification, and a verification result is displayed.

When a customer or merchant verifies the commodity, the natural biological textural feature image of the commodity is acquired and input to the verification system to be compared with the natural biological textural feature image information of the commodity acquired and reserved when the commodity is delivered, the system automatically determines whether or not the returned or exchanged commodity and the delivered commodity are the same one by comparing an obtained residual with a preset value and provides data results to the terminal customer or merchant. Biological feature recognition is carried out through the natural biological textual feature image acquisition technique, the image preprocessing technique and the image comparison technique, is an internationally-advanced recognition technique based on operational mathematical function matching, and is commonly used for face recognition, fingerprint recognition and the like.

A special print will appear only if the natural biological textural feature of a brand commodity such as the special texture of leather or color randomness of a specific region, or a special natural biological textural feather label added to the brand commodity with anti-counterfeit ink is processed through a special light source or temperature variation.

Whether the commodity is genuine is determined according to the natural biological textural feature of the brand commodity as follows: the system gives a prompt about the natural biological textural feature of the brand commodity such as the special texture of leather or color randomness of a specific region, or the special natural biological textural feather label added to the brand commodity with anti-counterfeit ink according to a commodity identity number provided, the special print appearing when the natural biological texture feature of the brand commodity or the special natural biological textural feather label is processed through the special light source or temperature variation is acquired and uploaded to automatically obtain a relevant matching data which are then processed through an operating algorithm to obtain intelligent verification information.

The brand owner acquires a natural biological textural feature image of the commodity before delivering the commodity by means of a matching package or tag of the genuine commodity, a natural biological textural feature image of a specific region with the ID recoded by the system is acquired through an intelligent verification management system, the system searches out relevant data through an algorithm and then operates and calculates the data to automatically make a judgment, and this is an effective means for anti-counterfeit verification management of brand commodities. Because the natural biological textural feature of the specific region is unique and is non-duplicable, damage to the benefits of brand manufacturers and customers caused by counterfeit commodities is effectively avoided, the consumption environment is standardized, the benefits of the customers and brand reputation are guaranteed, and a good consumption environment is created.

For instance, in the case where a genuine commodity is purchased while a counterfeit commodity is returned in seven days without for any reason, the natural biological textural feature of the genuine commodity is acquired in a warehouse before the genuine commodity is delivered; if the commodity has the textural feature, a region with specific coordinates as the center is selected, a unique ID of the commodity and an acquired natural biological textural pattern are bound and stored in a database system; if the commodity does not have an obvious biological textural feature, a special random textural pattern or fingerprint defined by the merchant is marked in a specific region with anti-counterfeit ink; an image of the specific region is acquired through an integrated light source control and temperature-control natural biological textural feature image device to be used as a database to be compared with a basic natural biological textural feature image; meanwhile, the unique ID of the commodity and the acquired natural biological textural image are named with a tag, brand of ID number to be bound and stored in the database system; when the warehouse receives a returned commodity, if the commodity has a textural feature, a region with specific coordinates the center is selected; if the commodity does not have an obvious textural feature, an image region corresponding to the basic image is searched out of the database according to the unique ID of the commodity; and a random pattern or fingerprint texture marked in the specific region appears under the effect of the integrated light source control and temperature-control natural biological textural feature image device; then, and the images are processed and compared, and the system makes a judgment particularly as follows: first, a bitmap image is loaded through a program and is converted into a vector diagram, and then the biological features and pattern texture are compared for similarity comparison. The similarity is judged by an algorithm based on the image processing technique to judge whether or not the delivered commodity and the returned commodity are the same commodity.

According to the above case, if it is judged through the verification system based on the natural biological textural feature of brand commodities that 100 counterfeit commodities are maliciously returned after genuine commodities are purchased from brand stores or e-commerce networks and the value of each brand commodity is 5000 yuan, the annual loss reaches 500,000 yuan. Generally, each brand commodity has about hundreds or thousands varieties of commodities, and consequentially, the direct economic loss of each brand owner is about five million to one hundred million per year. By adoption of the above solution, these losses can be avoided.

What is claimed is:
1. A commodity anti-counterfeit verification system based on natural information, comprising:
    an anti-counterfeit information generation module configured to generate unique anti-counterfeit information corresponding to a commodity before the commodity is delivered, the unique anti-counterfeit information being non-duplicable;
    an anti-counterfeit database configured to store the unique anti-counterfeit information generated by the anti-counterfeit information generation module; and
    an anti-counterfeit information verification module configured to carry out anti-counterfeit verification on the commodity when the commodity is returned according to the unique anti-counterfeit information stored in the anti-counterfeit database; wherein:
    the anti-counterfeit information generation module comprises:
    an identity information generator configured to randomly generate unique identify information corresponding to the commodity;
    a natural information generation assembly configured to generate natural information corresponding to the commodity, the natural information being non-duplicable; and
    an information binder configured to bind and pack the unique identify information generated by the identify information generator and the natural information generated by the natural information generation assembly,
    wherein the natural information generation assembly comprises:
        a natural information acquisition unit configured to acquire an image of a unique characteristic part of a commodity which has a unique textural property; and
        a natural information addition unit configured to add natural information of a commodity which does not have a unique textural property,
    wherein when the natural acquisition unit acquires the image, an angle of an integrated light source and a temperature variation need to be controlled within specified ranges, the natural acquisition unit having an integrated light source control and temperature-control.

2. The commodity anti-counterfeit verification system based on natural information according to claim 1, wherein the natural information is added specifically as follows: the natural information with a unique property is added to the commodity with anti-counterfeit ink.

3. The commodity anti-counterfeit verification system based on natural information according to claim 2, wherein the natural information with the unique property includes fingerprints.

4. The commodity anti-counterfeit verification system based on natural information according to claim 1, wherein the anti-counterfeit information verification module comprises:

an identify information recognizer configured to recognize identity information of the commodity to determine an identity of the commodity;

a natural information acquisition unit configured to acquire an image according to the natural information of the commodity; and an anti-counterfeit information verification unit configured to carry out anti-counterfeit verification on the commodity according to the identity of the commodity determined by the identify information recognizer and the image acquired by the natural information acquisition unit.

5. The commodity anti-counterfeit verification system based on natural information according to claim 4, wherein anti-counterfeit verification is carried out specifically as follows:

(s1) The identify information of the commodity is compared with information in the anti-counterfeit database to determine whether or not the commodity exists; if yes, (s2) is performed;

or, if not, it indicates that the commodity is a counterfeit commodity;

(s2) Natural information corresponding to the identify information of the commodity is extracted from the anti-counterfeit database and is compared with the acquired image to carry out image information matching; and (s3) Whether or not a matching result reaches a specified threshold is judged; if yes, it indicates that the commodity is a genuine commodity; or, if not, it indicates that the commodity is a counterfeit commodity.

6. The commodity anti-counterfeit verification system based on natural information according to claim 1, wherein the anti-counterfeit information verification module further comprises a verification result display assembly configured to display an anti-counterfeit verification result of the commodity.

7. The commodity anti-counterfeit verification system based on natural information according to claim 6, wherein the verification result display module comprises a display screen and a wireless communicator, and the wireless communicator is connected to an intelligent electronic device of a user.

8. The commodity anti-counterfeit verification system based on natural information according to claim 1, wherein the unique identity information includes one-dimensional codes, two-dimensional codes, three-dimensional codes, serial numbers, or RFID tags.

* * * * *